(12) United States Patent
Daly et al.

(10) Patent No.: US 6,407,181 B1
(45) Date of Patent: Jun. 18, 2002

(54) LOW TEMPERATURE CURING POWDER COATING FOR PRODUCING REDUCED GLOSS, WEATHERABLE COATINGS

(75) Inventors: Andrew T. Daly, Sinking Springs; Richard P. Haley; Joseph J. Kozlowski, both of Reading, all of PA (US); Jeno Muthiah, Arllington Heights, IL (US); Edward G. Nicholl, Reading, PA (US); Karl R. Wursthorn, Mohnton, PA (US); Carryll A. Seelig, Reading, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/642,305

(22) Filed: Aug. 21, 2000

(51) Int. Cl.$^7$ ................................................ C08L 67/02

(52) U.S. Cl. ........................ 525/408; 525/524; 525/438; 427/195; 428/411.1; 428/480; 428/413; 524/497; 526/273

(58) Field of Search ................................. 525/524, 408, 525/438; 526/273; 524/497; 427/195; 428/411.1, 480, 413

(56) References Cited

U.S. PATENT DOCUMENTS 5,436,311 A    7/1995   Hoebeke et al. ............ 525/174

*Primary Examiner*—Robert Dawson
*Assistant Examiner*—Kuo-Liang Peng

(57) ABSTRACT

A coating powder, based on glycidyl (meth)acrylate copolymer/carboxylic acid functional polyester chemistry, provides a smooth, weatherable, reduced gloss coating for use on heat sensitive substrates, such as wood. The glycidyl (meth)acrylate copolymer has an epoxy equivalent weight of 250 to 400 and the carboxylic acid functional polyester has a viscosity of 2500 cps or less at 200 C.

15 Claims, No Drawings

LOW TEMPERATURE CURING POWDER COATING FOR PRODUCING REDUCED GLOSS, WEATHERABLE COATINGS

The present invention is directed to glycidyl (meth) acrylate copolymer/carboxylic acid functional polyester coating powders which cure rapidly at low temperatures. Such powder coatings are ideal for coating heat-sensitive substrates such as wood, paper, various plastics and other materials which cannot withstand the excessive heat/time conditions necessary to cure traditional coatings. The inventive powder coatings produce a finish which exhibit reduced gloss, in the range of low to medium, and which exhibit excellent weatherability.

BACKGROUND OF THE INVENTION

U.S. Pat. No. 5,436,311 discloses a glycidyl (meth) acyrlate copolymer/carboxylic acid functional polyester coating powder which produces a weatherable, matte finish. This coating is described as being especially suitable for coating aluminum and steel because of the high temperatures needed for curing, specifically in the range of from 160° C. to 210° C., for long periods of time in an oven, such as up to 30 minutes. Such time/temperature parameters are unsuitable for heat-sensitive substrates, such as wood, which generally must be cured at temperatures of 170° C. or less for periods of no more than 5 minutes. To produce the matte finish described in the 311 patent, the epoxy content in the gylcidyl (meth)acrylate copolymer must be limited to between 0.3 and 2.2 milliequivalents of epoxy per gram of polymer. These values correspond to an epoxy equivalent weight of at least 450. This patent teaches that if the glycidyl (meth)acrylate copolymer has a higher epoxy content, then a gloss finish is obtained. However, the relatively high epoxy equivalent weight of the copolymer requires comparatively higher cure temperatures and longer cure oven residence times.

Recently, there has been a good deal of effort in the coatings industry directed to finding coatings for heat-sensitive substrates, such as wood, paper and plastics. A significant portion of the commercial market for coating powders is wooden or fiberboard cabinet doors such as those commonly found in kitchens. The coatings for this market must be both extremely durable because of heavy usage and weatherable because these surfaces are exposed to UV light which tends to cause the finish to yellow. Further, for aesthetic purposes, a reduced gloss (60° gloss in the range of 5 to 50: ASTM D523) finish is highly desired.

Conventional powder coatings require high temperatures to cure the resin(s), thus making them unacceptable for coating heat sensitive substrates. Compositions that are useful for heat sensitive substrates and which provide a smooth low gloss finish are based on bisphenol A epoxies. However, these compositions do not provide the UV stability that is required for certain applications, such as, for example, kitchen cabinets having a white surface finish. Over time, with exposure to sunlight, the surface finishes made from bisphenol A epoxies will fade, develop chalking or "yellow" out.

Accordingly, it is an object of the present invention to provide a low temperature curable powder coating which, once cured, exhibits a reduced gloss, weatherable coating.

STATEMENT OF THE INVENTION

In accordance with the present invention there is provided a low temperature curing coating powder which produces a reduced gloss, weatherable (i.e., UV-light resistant to eliminate fading, chalking and/or yellowing) coating on heat sensitive substrates such as, for example, wood, fiberboard, paper and certain plastics. The coating powder is a glycidyl (meth)acrylate/carboxylic acid functional polyester powder which incorporates a substantial amount of a glycidyl (meth) acrylate copolymer (A1) having a low epoxy equivalent weight, i.e., from 250 to 450, preferably from 250 to 400. It is surprising that despite the low epoxy equivalent weight of the copolymer, a low to medium gloss coating is obtained.

The present invention provides a coating powder, the composition of which contains an epoxy component and a carboxylic acid component. The epoxy component consists of a glycidyl (meth)acrylate copolymer having an epoxy equivalent weight of between 150 and 450, and is present at between 2 and 100 percent of the epoxy component. Further, the epoxy component may contain from 0 to 50 weight percent of a glycidyl (meth)acrylate copolymer having an epoxy equivalent weight of between 500 and 800. In addition, the epoxy component may contain from 0 to 20 weight percent of a crystalline aromatic epoxy having a melting point of between 80° and 150° C. The carboxylic acid component contains from 65 to 100 percent by weight of a carboxylic acid functional polyester having an acid number between 30 and 60 and a viscosity of 2500 cps or less at 200° C. Further, the carboxylic acid component may contain from 0 to 20 weight percent of a crystalline polycarboxylic acid or polyanhydride having an acid number between 150 and 400. In addition, an acrylic polymer having an acid number of between 100 and 400 may be present in the carboxylic acid component in an amount of between 0 and 15 weight percent. The stoichiometry of the carboxylic acid component to the epoxy component is between 0.7 and 2.7.

The carboxylic acid functional polyester B1 is synthesized or selected to have a low viscosity, i.e., from 2500 cps or less at 200° C. as measured on an ICI cone plate viscometer. Preferably, the viscosity is 2000 cps or less, more preferably 1500 cps or less, down to a viscosity which is too low to measure on an ICI cone plate viscometer. The low viscosity of the carboxylic functional polyester B1 in combination with the high epoxy functionality of at least part of the glycidyl (meth)acrylate copolymer of the epoxy functional component A provides for rapid fusing and curing of the coating powder, thus enabling application onto heat sensitive substrates.

In a first aspect of the invention, reduced gloss is achieved by employing, as the epoxy functional component A, a mixture of glycidyl (meth)acrylate copolymers having an epoxy equivalent weight between 250 and 450, preferably between 250 and 400, and between 10 and 50 weight percent of a glycidyl (meth)acrylate copolymer A2 having an epoxy equivalent weight of between 500 and 800. The presence of copolymer A1, having a low epoxy equivalent weight, provides for rapid curing at low temperatures, thus making the powder coating ideal for application onto heat sensitive substrates.

In a second aspect of the invention, at least 50 weight percent up to 100 weight percent of the epoxy component is a glycidyl (meth)acrylate copolymer A1 having an epoxy equivalent weight of between 250 and 450, preferably between 250 and 400. To reduce gloss, between 1 and 20 weight percent of the composition is a crystalline material which may be either part of the epoxy component or part of the carboxylic acid component B. Herein, "crystalline" is defined as being a component which exhibits a single sharp melting point on a differential scanning calorimeter (DSC)

in the range of 80–150° C. The crystalline material is preferably a polycarboxylic acid B2 having a carboxylic acid group functionality of 2 to 4, and an acid number between 150 and 400, particularly a dicarboxylic acid such as sebacic acid. Alternatively, the crystalline material may be a crystalline aromatic epoxy (A3) such as bisphenyl epoxy, e.g., RSS 1407, sold by Shell.

The coating powder formulation may incorporate both a mixture of lower and higher epoxy equivalent weight glycidyl (methacrylate) copolymers A1 and A2 and an additional crystalline component A3 or B2.

Another means of reducing gloss is to incorporate into the carboxylic acid component B between 2 and 15 weight percent of an acrylic resin (B3) having an acid number between 100 and 400.

The proper selection of components will result in a medium to low gloss finish in a smooth cured coating, i.e., 60° gloss levels (per ASTM D523) of 50 or less, down to as low as 5.

DETAILED DESCRIPTION

The rapid fusion and curing of the coating powders according to the present invention is achieved by the high epoxy functionality of at least a substantial portion of the glycidyl (meth)acrylate ("GMA") copolymer A1 in conjunction with the low viscosity of a carboxylic acid functional polyester B1. The low viscosity of the polyester B1 promotes the rapid fusion of the coating powder while the high epoxy functionality of the GMA A1 promotes a rapid cure.

It is believed that low gloss results from the incompatibility of the blended powder components. Due to the low viscosity of polyester B1, the polyester and the GMA do not fully mix when the components are melt blended via, for example, an extruder, where temperatures are in the range of 80 to 120° C. Contributing to the formation of a low gloss coating is the interaction between the low epoxy equivalent weight GMA A1 with the higher epoxy equivalent weight GMA A2. Even if up to 50 weight percent of the epoxy components is a higher epoxy equivalent weight GMA A2, the coating powder is still suitable for heat sensitive substrates because the lower epoxy equivalent weight GMA provides a rapid initial cure.

Incompatibility may also be achieved by the inclusion of crystalline materials, either in the epoxy component A or the carboxylic component B. Such crystalline components further reduce viscosities in the melt blending of the components, typically, at the extruder.

Crystalline carboxylic acid components include polycarboxylic acids B2, particularly dicarboxylic acids, such as sebacic acid, dodecanedicarboxylic acid, adipic acid, dicarboxylic acid mixtures, etc. having functionalities up to 4. Crystalline carboxylic acid components also include crystalline polyesters B1c having carboxylic acid functionalities of 2 or higher, such as VXL 1381 polyanhydride or Morflex 1000. For purposes of this invention, crystalline carboxylic acid functional polyesters B1c are those which exhibit a single sharp melting point in the range of 60–150° C., as measured by a Differential Scanning Calorimeter (DSC). Such crystalline polyesters have viscosities of 500 cps or less at 200° C. as measured with an ICI cone plate viscometer down to viscosities below the effective measuring range of the device. More amorphous polyesters B1a used in the invention have viscosities in the range of 500–2500 cps at 200° C. as measured with the ICI cone plate viscometer. Depending upon the degree of gloss reduction desired, the low viscosity carboxylic acid functional polymer B1 may be a crystalline polymer B1c, a more amorphous polymer B1a or a mixture of a crystalline polymer B1c and a more amorphous polyester B1a, the weight ratio of B1c to B1a may range from 95:5 to 5:95.

Acrylic polymers B3 having high acid numbers are formed by polymerizing vinyl monomers, at least 50 mole percent of which are acrylic monomers, and the monomer mixture from which the polymer is formed include sufficient carboxylic acid functional (including acid anhydride functional) monomers, to provide an acid number between 100 and 400. Acid functional monomers include acid functional acrylates, such as acrylic acid and methacrylic acid, and unsaturated anhydrides, such as maleic anhydride. The weight average molecular weights of acrylic monomers B3 range from 1000 to 20,000.

Crystalline epoxy components A2 include crystalline aromatic epoxies, such as bisphenol A epoxy, commercially available as RSS 1407 from Shell.

The low epoxy equivalent weight GMA A1 may be produced by copolymerizing between 0 and 100 weight percent glycidyl acrylate or glycidyl methacrylate and between 20 and 80 weight percent other vinyl monomers, such as methyl methacrylate, butyl methacrylate, styrene, etc. The number average molecular weight of this GMA is between 3000 and 10,000. If a higher epoxy equivalent weight GMA is used, it is produced by using a lower level of glycidyl (meth)acrylate, such as between 10 and 70 weight percent of the monomer content and a corresponding amount of the other vinyl monomers. The number average molecular weight range of GMA A2 is also between 3000 and 10,000. The glass transition temperatures (Tg) of the GMA's are in the range of 40–70° C., and their viscosities, as determined by the ICI method at 200° C., are 3000 cps or below.

To enhance gloss reduction, comonomers of glycidyl (meth)acrylate are selected which tend to be incompatible with the polyester. For example, if the polyester B1 contains a substantial level of aromatic monomers, alkyl acrylates, such as methyl (meth)acrylate, ethyl (meth)acrylate, which are incorporated into the GMA's, will tend to decrease compatibility between the polyester B1 and the GMA's A1 and A2.

Examples of vinyl comonomers for polymerizing along with glycidyl (meth)acrylate monomer(s) include, but are not limited to, methyl methacrylate, methyl acrylate, ethyl acrylate, butyl acrylate, 2-ethylhexyl acrylate, ethyl methacrylate, butyl methacrylate and styrene, either alone or in admixture.

The glycidyl group containing acrylic copolymer is prepared by conventional polymerization techniques, either in mass, in emulsion, or in solution in an organic solvent. The nature of the solvent is unimportant, provided that it is inert and that it readily dissolves the monomers and the synthesized copolymer. Suitable solvents include toluene, ethyl acetate, xylene, etc. The monomers are copolymerized in the presence of a free radical polymerization initiator (benzoyl peroxide, dibutyl peroxide, azo-bis-isobutyronitrile, etc.) in an amount of between 0.1 and 1% by weight of the monomers.

To achieve good control of the molecular weight and its distribution, a chain transfer agent, preferably of the mercaptan type, such as, for example, n-dodecylmercaptan, t-dodecanethiol, isooctylmercaptan, or of the carbon halide type, such as carbon tetrabromide, bromotrichloromethane, etc. is also added in the course of the reaction. The chain transfer agent is used in an amount of from 1.5 to 4%, preferably between 2 and 3.5% by weight of the monomers used in the copolymerization process.

A cylindrical, double-walled reactor equipped with a stirrer, a condenser, an inert gas (for example, nitrogen) inlet and outlet and a metering pump feed system is generally used to prepare the glycidyl group containing acrylic copolymer.

Polymerization is carried out under conventional conditions. Thus, when polymerization is carried out in solution, for example, an organic solvent is introduced into the reactor and heated to reflux temperature under an inert gas atmosphere (such as, for example, nitrogen or carbon dioxide), and a homogeneous mixture of the required monomers, free radical polymerization initiator and chain transfer agent is then added to the solvent gradually over several hours. The reaction mixture is then maintained at reflux temperature for some hours, while stirring, and the major portion of the solvent is then distilled off. The copolymer obtained is subsequently freed from the remainder of the solvent in vacuo. The acrylic copolymer obtained is in the form of a solid product, which is easily ground to give a powder.

The low viscosity polyesters B1 are generally linear. Terminal carboxylic acid groups provide a carboxylic acid functionality of at least 2, but the polyesters may be capped with a multifunctional carboxylic acid, such as trimellitic anhydride, to provide higher acid functionality, e.g., an acid functionality of 4 in the case of trimellitic anhydride. Functionality of greater than two can be obtained by the introduction of higher functionality monomers such as trimethylolpropane or triethylol propane in the polyester backbone. The polyesters have acid numbers between 20 and 60 mg KOH/g, number average molecular weights between 2200 and 6000, and glass transition temperatures (Tg) between 40° and 80° C.

The acid constituent of the linear carboxyl group containing polyester is an organic dicarboxylic acid, which can be an aromatic dicarboxylic acid, such as, for example, terephthalic acid, isophthalic acid, and phthalic acid, or an aliphatic or cycloaliphatic dicarboxylic acid, such as, for example, adipic acid, succinic acid, 1,4-cyclohexanedicarboxylic acid, alone or in admixture. These acids can be used in the form of the anhydride, or also in the form of an ester with a lower aliphatic alcohol. The use of higher amounts of aliphatic dicarboxylic acids tend to reduce viscosities of the polyester.

The alcoholic constituent of the linear carboxyl group containing polyester is an organic dihydroxy compound, which is preferably selected from the aliphatic diols, such as, for example, neopentyl glycol, ethylene glycol, diethylene glycol, 1,4-butanediol, 1,6-hexanediol, neopentyl glycol hydroxypivalate, 1,4-cyclohexanedimethanol, 2,2-bis(4-hydroxycyclohexyl)propane, alone or in admixture.

The viscosity of the polyesters may be controlled by proper monomer selection. The monomers may be selected to provide a crystalline polyester which will generally have a low viscosity. Crystallinity is increased by the selection of a homogeneous monomer mix, such as, for example, a single diol and a single dicarboxylic acid, as well as by the use of aliphatic monomers such as a mixture of 1,6-hexanediol and adipic acid. In more amorphous polyesters, aliphatic, rather than aromatic, monomers tend to reduce viscosity.

The carboxyl group containing polyester is prepared by conventional methods for synthesizing polyesters by direct esterification or by transesterification, in one or more steps. In the latter case, a hydroxyl group containing polyester is first prepared from one or more organic dicarboxylic acids (or their functional derivatives) and an excess of an organic dihydroxy compound, and the hydroxyl group containing polyester thus obtained is then esterified with an organic polycarboxylic acid to give a linear carboxyl containing polyester.

The polyester synthesis is generally carried out in a reactor equipped with a stirrer, an inert gas (nitrogen, for example) inlet and outlet, a thermocouple, an adiabatic column, a condenser, a water separator and a vacuum connection tube.

The esterification conditions are the classical conditions, that is to say a conventional esterification catalyst, such as dibutyltin oxide or n-butyltin trioctanoate, can be used in an amount of 0.01 to 0.5% by weight of the reagents, and optionally, an antioxidant, for example, tributyl phosphite, can be added in an amount of 0.01 to 0.5% by weight of the reagents.

The polyesterification is generally carried out at a temperature which is gradually increased from 130° C. to between 200° and 240° C., first under normal pressure and then under reduced pressure. This temperature is maintained until a polyester which has the desired hydroxyl and/or acid number is obtained. In a two step process, the reaction mixture containing the hydroxyl containing polyester obtained in the first step is allowed to cool to 200° C., the desired amount of polycarboxylic acid is added and the temperature is brought to 225° C. This temperature is maintained, first under normal pressure and then under reduced pressure until a carboxyl containing polyester having the desired acid number is obtained, which can vary between 20 and 50 mgKOH/g polyester. The degree of esterification is monitored by determining the amount of water formed in the course of the reaction and the properties of the polyester obtained, for example the acid number, the molecular weight or the viscosity. At the end of the synthesis process, the polyester is cast into a thick layer, allowed to cool and ground into particles having an average size of from a fraction of a mm to a few mm.

The powdered thermosetting compositions of the present invention can be prepared by homogeneously mixing the resin components A and B with various auxiliary substances conventionally used for preparing powdered paints and varnishes.

This homogenization is carried out, for example, by melting the resin components and the various auxiliary substances at a temperature of between 90° and 100° C., preferably in an extruder, for example, a Buss Ko-Kneter extruder or a twin screw extruder of the Werner-Pfleiderer or Baker Perkins type. The extrudate is then allowed to cool, and is ground and sieved to give a powder, the particle size of which is between 20 and 100, preferably between 30 and 40 micrometers.

The auxiliary substances which can be added to the powdered thermosetting compositions are, for example, pigments, such as titanium dioxide or iron oxides, organic dyestuffs, fillers, such as barium sulfate or calcium sulfate or carbonate, flow control agents, such as Resiflow PV5 (from Worlee) or Modaflow (from Monsanto) or Acronal 4F (from BASF), plasticizers, such as dicyclohexyl phthalate or triphenyl phosphate, and grinding aids. These auxiliary substances are used in the usual amounts, it being understood that if the thermosetting compositions according to the invention are used as varnishes, auxiliary substances having opacifying properties will be omitted. Cross linking catalysts which are known per se, of the amine, phosphine or ammonium or phosphonium salt type, can also be added.

Thermosetting compositions of the present invention are suitable for application by conventional techniques, such as by use of a spray gun in an electrostatic field or with a triboelectric gun in which the powder is charged by friction, or by conventional fluidized bed coating techniques, as well.

After having been applied to the target article, the coatings deposited on the suface are cured by heating in an oven set at a temperature of from 350° C. to 425° C., for a period of up to 5 minutes.

The coating powders of the present invention are particularly suited to coating lignocellulosic materials whether derived from trees or other plants and whether the lignocellulosic material is in its natural state or its fibers have been separated, felted and/or compressed. Thus, in addition to wood, lignocellulosic materials include hardboard, medium density fiber board (MDF), strand board and paper.

The invention will now be described in greater detail by way of specific examples.

EXAMPLES

Samples were prepared by selecting components based on their various physical and chemical characteristics. These characteristics are as follows:

Resin Materials:

Polyester Morkote 500 has an acid functionality of 2.0 & a viscosity of 2500 cps at 200° C.

Polyester Ruco 911 has an acid functionality of 2.0 and a viscosity of 1500 cps at 200° C.

Polyester Morkote 600 has an acid functionality of 4.0 and a viscosity of 2500 cps at 200° C. (contains a catalyst which accelerates the rate of cure)

Polyester Ruco 921 has an acid functionality of between 2.0 and 2.5 and a viscosity of 1500 cps at 200° C. (contains a catalyst which accelerates the rate of cure)

G 151 is an acid functional acrylic resin (MW 3000) with an acid functionality of between 6.0 and 8.0 (functions as a matting agent)

GMA 300 (epoxy equivalent weight of 300) is a glycidyl functional resin with an acid functionality of @8.0

GMA 252 (epoxy equivalent weight of 252) is a glycidyl functional resin Crylcoat 700 (epoxy equivalent weight of 700) is a glycidyl functional resin A comparison of the effects of using different resins exhibiting different viscosities and functionalities on the finish coating was conducted. Formulations were prepared as shown in Table 1 and an evaluation of each formulation's gloss and MEK rub off characteristics was then performed. All amounts are shown in phr (parts per hundred parts of the resin plus curing agent).

TABLE 1

| | Formulations | | | |
|---|---|---|---|---|
| Raw Material | (1) | (2) | (3) | (4) |
| Morkote 500 | 86 | | | |
| Ruco 911 | | 80 | | 60 |
| Morkote 600 | | | 80 | |
| GMA 252 | 14 | | | |
| GMA 300 | | 20 | 20 | |
| Crylcoat 700 | | | | 40 |
| G 151 | | 7 | 7 | 7 |
| Modaflow 2000 | 1 | 1 | 1 | 1 |
| Surfynol 104S | 1 | 1 | 1 | 1 |

TABLE 1-continued

| | Formulations | | | |
|---|---|---|---|---|
| Raw Material | (1) | (2) | (3) | (4) |
| P 101 | 1 | | | |
| 2 PI | | 1 | 1 | 1 |
| TiO2 | 30 | 10 | 20 | 20 |
| Properties | | | | |
| 60° gloss | 65 | 14 | 14 | 7 |
| MEK | Slight rub off | Slight rub off | Slight rub off* | Moderate rub off* |
| Appearance | heavy orange peel | moderate orange peel | textured orange peel | moderate orange peel |

*denotes unacceptable performance

Samples 1 and 2 indicate that low gloss can be achieved with lower equivalent weight resins if the viscosity is less than 2500 and the functionality of the polyesters is less than 2.5. As seen from sample 3, when Morkote 600, which has a functionality greater than 2.5, there is a significant amount of unacceptable premature reaction in the extruder as evidenced by the texturing effect and a visually high gloss coating. Sample 4 indicates that low gloss can be achieved by use of a linear low viscosity resin (Ruco 911) in combination with a higher functional acrylic resin (G 151) and a higher equivalent GMA cross-linker (Crylcoat 700) although cure has been reduced.

In order to control gloss, the amount of the higher acid functional material (G 151) may be changed to between 2 and 10 phr, as exhibited by examples 2–4. Other catalysts may be used to catalyze the reaction between the acid functional material and the glycidyl groups of the GMA components. Such catalysts are, for example, ammonium salts and phosphines. The viscosity can be further reduced by adding carboxylic containing crystalline materials, such as, for example, low molecular weight diacids, in an effort to achieve lower gloss levels and improved smoothness.

TABLE 2

Effect of the Epoxy Equivalent Weights of the GMA Copolymers and Catalysts

| | Samples (Control) | | | | | | | |
|---|---|---|---|---|---|---|---|---|
| Raw Material | 5 | 6 | 7 | 8 | 9 | 10 | 11 | 12 |
| Ruco 911 | 60 | 70 | 80 | 80 | 75 | 70 | | 70 |
| GMA 300 | 40 | 20 | 20 | | | 30 | 30 | 30 |
| G 151 | 7 | 7 | 7 | 7 | 7 | | | |
| 2 PI | 1 | 1 | | | | | 1 | |
| Modaflow 2000 | 1 | 1 | 1 | 1 | 1 | 1 | 1 | 1 |
| Surfynol 104 S | 1 | 1 | | 1 | 1 | | 1 | |
| Morflex 2000 | | | 10 | | | | | |
| TR 93 | 20 | 20 | 15 | 15 | | 10 | 20 | 30 |
| Curezol C17 Imidazole | | | 1 | 2 | 2 | 1 | | 1 |
| GMA 252 | | | | 20 | 20 | | | |
| Crystalline Polyester | | | | | | | 70 | |
| EP 550 | | | | | | 10 | | 10 |
| Sebacic Acid | | | | | | 5 | 20 | 5 | 8 |
| VXL 1381 | | | | | | | | 12 |
| Properties | | | | | | | | |
| 60° Gloss | 7# | 4* | 10* | 18* | 4* | 10* | 15 | 15* |
| MEK Rub Off | a | b | a | a | a | >a | No | a |

Legend: #-Moderate OP
*-Smooth Surface
a-Slight Rub Off
b-Moderate Rub Off

Samples 5, 6, 9 and 12 (sample 5 is a control) indicate that improved smoothness and lower gloss are achieved with the addition of carboxylic or anhydride containing crystalline materials such as Morflex 2000, sebacic acid or VXL-1381. Samples 2 and 5 also demonstrate that the level of GMA can be used in the range of 10–50%. Samples 10, 11 and 12 indicate that low gloss can be achieved with the use of crystalline resins without the need for including higher acid functional acrylic resins. It has also been noted that higher than stoichiometric levels of sebacic acid as in sample 10 give improved shelf stability, as well. Samples 8, 10 and 11 indicate the effects of varying molecular and equivalent weights of the GMA on gloss. The higher molecular weight EP 550 is able to replace the acid functional acrylic used in examples 1–9. The catalyst level can be varied to between 0 and 2 phr without impairing the ability to achieve low gloss (samples 7, 8 and 9). Thus, what is clearly surprising in view of the disclosure provided in U.S. Pat. No. 5,436,311, is that lower gloss levels may be achieved with lower equivalent weight crosslinkers which are required for low temperature cure.

We claim:

1. A coating powder, the composition of which comprises
   A) an epoxy component comprising
      A1) a glycidyl (meth)acrylate copolymer having an epoxy equivalent weight of between 250 and 450, present at between 50 and 100 weight percent of said epoxy component A,
      A2) a glycidyl (meth)acrylate polymer having an epoxy equivalent weight of between 500 and 800, present at between 0 and 50 weight percent of said epoxy component A, and
      A3) a crystalline aromatic epoxy having a melting point between 80° and 150° C., present at between 0 and 20 weight percent of said epoxy component A; and
   B) a carboxylic acid component comprising
      B1) a carboxylic acid functional polyester having an acid number between 30 and 60 and a viscosity of 2500 cps or less at 200° C., present at between 65 and 100 weight percent of said carboxylic acid component
      B2) a crystalline polycarboxylic acid or polyanhydride having an acid number between 150 and 400, present at between 0 and 20 weight percent of said carboxylic component B, and
      B3) an acrylic polymer having an acid number between 100 and 400, present at between 0 and 15 weight percent of said carboxylic acid component B; the stoichiometry of said carboxylic acid component B to said epoxy component A being between 0.7 and 2.7.

2. The coating powder according to claim 1 wherein said polyester B1 further comprises a crystalline polyester B1c having a viscosity at 200° C. of 500 cps or below, and a polyester component B1a having a viscosity at 200° C. of between 500 and 2500 cps.

3. The coating powder according to claim 2 wherein the weight ratio of B1c to B1a is between 95:5 and 5:95.

4. The coating powder according to claim 1 wherein said glycidyl (meth)acrylate copolymer A2 is present in epoxy component A at between 10 and 50 weight percent of said epoxy component A.

5. The coating powder according to claim 4 wherein said crystalline aromatic epoxy A3 is present in epoxy component A at between 5 and 20 weight percent of said epoxy component A.

6. The coating powder according to claim 1 wherein said crystalline aromatic epoxy A3 is bis-phenyl epoxy.

7. The coating powder according to claim 4 wherein said acrylic polymer B3 is present at between 2 and 15 weight percent of said carboxylic acid component B.

8. The coating powder according to claim 1 wherein said crystalline aromatic epoxy A3 is present in epoxy component A at between 5 and 20 weight percent of said epoxy component A.

9. The coating powder according to claim 1 wherein said gylcidyl (meth)acrylate copolymer A2 is present in epoxy component A at between 10 and 50 weight percent of said epoxy component A and said crystalline polycarboxylic acid is present at between 5 and 20 weight percent of said carboxylic acid component B.

10. The coating powder according to claim 1 wherein said crystalline aromatic epoxy A3 is present in epoxy component A at between 5 and 20 weight percent of said epoxy component A and said acrylic polymer B3 is present in carboxylic acid component B at between 2 and 15 weight percent of said carboxylic acid component B.

11. The coating powder according to claim 1 wherein the crystalline polycarboxylic acid B2 is present in carboxylic acid component B at between 5 and 20 weight percent of said carboxylic acid component B.

12. The coating powder according to claim 1 wherein said crystalline polycarboxylic acid B2 is selected from the group consisting of sebacic acid, dodecanecarboxylic acid, adipic acid and dicarboxylic acid.

13. The coating powder according to claim 11 wherein the acrylic polymer is present at between 2 and 15 weight percent of said carboxylic acid component B.

14. The coating powder according to claim 1 wherein the acrylic polymer B3 is present at between 2 and 15 weight percent of said carboxylic acid component B.

15. The coating powder according to claim 1 further comprising one or more additives of the group consisting of pigments, organic dyestuffs, fillers, extenders, flow control agents, plasticizers, and cross-linking catalysts.

* * * * *